US008220063B2

United States Patent
Ting (10) Patent No.: US 8,220,063 B2
(45) Date of Patent: Jul. 10, 2012

(54) BIOMETRIC AUTHENTICATION FOR REMOTE INITIATION OF ACTIONS AND SERVICES

(75) Inventor: David M. T. Ting, Sudbury, MA (US)

(73) Assignee: Imprivata, Inc., Lexington, MA (US)

( * ) Notice: Subject to any disclaimer, the term of this patent is extended or adjusted under 35 U.S.C. 154(b) by 115 days.

(21) Appl. No.: 12/338,196

(22) Filed: Dec. 18, 2008

(65) Prior Publication Data

US 2009/0100270 A1   Apr. 16, 2009

Related U.S. Application Data

(63) Continuation of application No. 11/846,882, filed on Aug. 29, 2007, now abandoned, which is a continuation of application No. 10/147,947, filed on May 17, 2002, now Pat. No. 7,356,705.

(60) Provisional application No. 60/291,900, filed on May 18, 2001.

(51) Int. Cl.
*G06F 7/04* (2006.01)
*G06F 15/16* (2006.01)
*H04L 29/06* (2006.01)
*G06F 17/30* (2006.01)

(52) U.S. Cl. ........... 726/29; 726/8; 726/22; 726/28; 726/30; 713/170; 713/176; 713/186

(58) Field of Classification Search ............ 713/186, 713/176, 170; 726/8, 22, 28, 29, 30
See application file for complete search history.

(56) References Cited

U.S. PATENT DOCUMENTS

| | | | | |
|---|---|---|---|---|
| 5,844,497 | A * | 12/1998 | Gray | 340/5.54 |
| 5,930,804 | A * | 7/1999 | Yu et al. | 1/1 |
| 6,076,167 | A * | 6/2000 | Borza | 726/5 |
| 6,108,420 | A * | 8/2000 | Larose et al. | 705/59 |
| 6,282,711 | B1 * | 8/2001 | Halpern et al. | 717/175 |
| 6,324,691 | B1 * | 11/2001 | Gazdik | 717/178 |
| 6,362,836 | B1 * | 3/2002 | Shaw et al. | 715/744 |
| 6,578,142 | B1 * | 6/2003 | Anderson et al. | 713/2 |
| 7,308,718 | B1 * | 12/2007 | Brookner | 726/29 |
| 2002/0083429 | A1 * | 6/2002 | Rozenfeld et al. | 717/174 |
| 2002/0124190 | A1 * | 9/2002 | Siegel et al. | 713/202 |

OTHER PUBLICATIONS

Jansen, Wayne A. "Countermeasures for Mobile Agent Security", 2000.*

* cited by examiner

*Primary Examiner* — Michael Simitoski
(74) *Attorney, Agent, or Firm* — Bingham McCutchen LLP

(57) ABSTRACT

In one aspect, the invention relates to generating a trusted communication channel with a client. An agent module is provided at the client along with a task set including one or more tasks. One or more client components needed to complete each of the tasks of the task set is determined, and it is further determined whether each of the needed client components is trustworthy. An equivalent component for components determined to be untrustworthy may be provided.

11 Claims, 3 Drawing Sheets

FIG. 3

BIOMETRIC AUTHENTICATION FOR REMOTE INITIATION OF ACTIONS AND SERVICES

CROSS-REFERENCE TO RELATED APPLICATIONS

This application is a continuation application of and claims priority to U.S. patent application Ser. No. 11/846,882, filed Aug. 29, 2007, which is a continuation application of and claims priority to U.S. patent application Ser. No. 10/147,947, now U.S. Pat. Ser. No. 7,356,705, entitled "Biometric Authentication for Remote Initiation of Actions and Services" filed on May 17, 2002, which claims priority to U.S. provisional patent application Ser. No. 60/291,900, filed May 18, 2001.

FIELD OF INVENTION

The invention relates generally to biometrics. More specifically, in one embodiment, the invention relates to systems and methods for using biometric authentication over a network.

BACKGROUND

The Internet accords a global community of computer users access to applications and information that traditionally were highly restricted. For example, users can now undertake a wide variety of financial transactions online, or obtain access to financial and other sensitive records online. The increased accessibility of such information, while enormously convenient, jeopardizes privacy and invites tampering and electronic theft. In some known prior art systems, sensitive information that was once physically guarded can now be obtained on the Internet by anyone who can generate the correct server URL, logon and password.

Indeed, the mere need for Internet users to keep track of multiple URLs, logon names, passwords and PINs in order to access different information further increases the chances of unauthorized use and loss of private information. Users may resort to using the same logon name and password combinations for all accounts, rendering them equally vulnerable if unauthorized access to a single account is obtained. On the other hand, security-conscious users who maintain different logon names and passwords for individual accounts may, to avoid confusion, write them down where they may be found or store them on easily stolen devices such as personal digital assistants—thereby undermining their own efforts. It can be argued that those who routinely change their passwords but record them on paper or in a computer file are at greater risk of being compromised than those who use a single but difficult-to-crack password. At the very least, such security-conscious individuals risk forgetting their access information, necessitating time-consuming calls to customer-support lines.

From the perspective of authentication, passwords and PINs cannot guarantee identity; the identification is no more reliable than the security of the password. In some known prior art systems with password authentication, the server carrying out a transaction can only prove that the correct password was entered—not that it was entered by an authorized person. A password can originate from password-cracking software just as easily as from the real user. Digital certificates improve security by authenticating an end point (i.e., that a message originated with a particular client terminal), but cannot create a non-repudiated link to support the claim that a particular user really did engage in a transaction.

SUMMARY OF THE INVENTION

The present invention utilizes strong authentication to offer highly reliable authentication that creates links that cannot be repudiated for transactions initiated within the context of an authenticated session. As used herein, the term "strong authentication" can have several meanings. In one connotation, it represents the use of biometric data. Strong authentication can also mean authentication involving use of two or more authentication factors, i.e., something the person knows (e.g., a password or a shared secret); something the person possesses (e.g., a USB token, a "smart card," or a digital certificate); and/or some characteristics of the person (e.g., a biometric parameter such as a fingerprint or voice print). The illustrative embodiments within this specification generally use biometric data and, in particular, fingerprint data. It is to be understood, however, that other forms of strong authentication can also or alternatively be employed, and the present invention is in no way limited solely to biometric and/or fingerprint data.

The present invention utilizes biometric authentication or other strong authentication as a basis for remotely initiating an action that can occur, for example, on a particular user's client computer based on the user's identity. Thus, a "provisioning" application may allow a server to remotely configure the client computer by downloading and directing installation of application programs, data, and other stored components based on the user's identity. Indeed, the user's entire computer configuration can be duplicated in this way, facilitating recovery on a new machine following theft or malfunction of the original computer. Naturally, reliable verification of the user's identity is critical in order to avoid misdirection of information and capabilities.

Unlike passwords, which are no more than secrets vulnerable to theft, biometrics validation matches physical characteristics of the user against stored characteristics to identify the user. Once a user is positively identified, in one embodiment, the server unlocks and validates the user's credentials for purposes of initiating an action. A user's credentials may, for example, represent an account login/password combination or X.509 certificate. This biometric approach offers substantial flexibility in terms of accessibility (from computers, mobile devices, etc.) and relieves the user from responsibility for managing the integrity of such credentials. Biometric scanners are inexpensive and small, and may, for example, be easily incorporated into keyboards and mobile client devices.

In one embodiment, the system includes a client agent that treats the client as an untrustworthy environment until the client agent can determine, one-by-one, that the components of the client needed by the client agent are trustworthy. The client agent thereby creates a trusted channel to obtain and transmit biometric data. Once the user is authenticated, the trusted channel can be used to obtain from and transmit to servers on a network user credentials needed for access to requested services.

In one aspect, the invention relates to a method for generating a trusted communication channel with a client. The method comprises providing an agent module at the client and providing a task set including one or more tasks. The method may also comprise determining one or more client components needed to complete each of the tasks of the task set and determining whether each of the needed client components is trustworthy. In one embodiment, the method includes transmitting to the client an equivalent component for one of the needed client components determined not to be trustworthy.

In another embodiment, the method further comprises retrieving a candidate set of strong authentication data using at least one of the needed client components determined to be trustworthy. In still another embodiment, the method further comprises transmitting a candidate set of strong authentication data using at least one of the one or more needed client components determined to be trustworthy. In all embodiments, the candidate set of strong authentication data may be a candidate set of biometric data.

In another embodiment, the method further comprises comparing the candidate set of biometric data with a reference set of biometric data to verify a user associated with the client, and transmitting an application program for execution on the client if there is a sufficient match between the candidate set of biometric data and the reference set of biometric data. In yet another embodiment, the method further comprises comparing the candidate set of biometric data with a reference set of biometric data to authenticate a user associated with the client. In this embodiment, if there is a sufficient match between the candidate set of biometric data and the reference set of biometric data, a new task set is provided based at least in part on the authenticated user.

In another embodiment, the method further comprises determining one or more additional client components needed to complete each task of the new task set and determining whether each of the needed additional client components is trustworthy. In yet another embodiment, the new task set includes a task of retrieving user credentials for the authenticated user. In this embodiment, the method further comprises retrieving the reference set of biometric data associated with an electronic vault that is itself associated with the authenticated user, and retrieving from the electronic vault the user credentials. The method may further comprise retrieving a reference set of biometric data from a template.

In another aspect, the invention relates to a client for generating a trusted communication channel. The client preferably comprises a task set, one or more client components and an agent module. The task set has one or more tasks. The client component(s) are those components that are needed to complete the one or more tasks of the task set. The agent module is configured to determine whether each of the one or more client components is trustworthy. In one embodiment, the agent module is further configured to retrieve a candidate set of strong authentication data using those one or more client components that are determined to be trustworthy.

In another embodiment, the client further comprises a transceiver module configured to transmit a candidate set of strong authentication data using those one or more client components that are determined to be trustworthy. In all embodiments, the candidate set of strong authentication data may include biometric data. In yet another embodiment, the transceiver module can be configured to receive a new task set, and the agent module can be configured to determine one or more additional client components needed to complete each task of the new task set and also to determine whether each of the needed additional client components is trustworthy. In another embodiment, the client further comprises one or more equivalent components needed to complete the one or more tasks or the task set. In this embodiment, the transceiver module can be configured to request and receive the one or more equivalent components in response to the agent module determining that at least on of the one or more client components are not trustworthy.

In another aspect, the invention relates to a system for generating a trusted communication channel. The system preferably includes a client and a server. The client preferably includes a task set having one or more tasks, one or more client components needed to complete the one or more tasks of the task set, and an agent module configured to determine whether each of the one or more client components is trustworthy. The server preferably is in communication with the client and includes a reference set of strong authentication data. In all embodiments, the reference set of strong authentication data may include biometric data.

In one embodiment, the server further comprises one or more equivalent components needed to complete the one or more tasks of the task set and a transceiver module configured to transmit the one or more equivalent components in response to the agent module determining that at least one of the client components is not trustworthy. In another embodiment, the agent module is further configured to retrieve a candidate set of strong authentication data using those one or more client components that are determined to be trustworthy.

In another embodiment, the client further comprises a transceiver module configured to transmit a candidate set of strong authentication data using those one or more client components that are determined to be trustworthy. In yet another embodiment, the server further comprises a comparator module and a transceiver module. The comparator module is configured to compare a candidate set of biometric data received from the client with the reference set of biometric data to verify a user associated with the client. The transceiver module is configured to allow transmission of an application program for execution on the client if there is a sufficient match between the candidate set of biometric data and the reference set of biometric data.

In another embodiment, the transceiver module is configured to transmit a new task set to the client if there is a sufficient match between the candidate set of biometric data and the reference set of biometric data. In yet another embodiment, the agent module is further configured to determine one or more additional client components needed to complete each task of the new task set and also to determine whether each of the needed one or more additional client components is trustworthy. In another embodiment, the server further comprises an electronic vault. The electronic vault may include one or more realms having one or more vaults having one or more folders.

In another aspect, the invention relates to a method for provisioning a client computer. The method comprises establishing an identity of a client user based on strong authentication data and, based on the established user identity, remotely providing to the client computer a set of provisioning modules specific to the user for execution on the client computer. The execution of the provisioning modules causes transfer of information onto the client computer. In all embodiments, the strong authentication data can be biometric indicia.

In one embodiment, the execution of the provisioning modules can cause installation of at least one of application programs and user-specific data onto the client computer. The biometric indicia can be obtained from the user by the client computer and transmitted to a server for identity establishment. Alternatively, the biometric indicia can be obtained from the user by the client computer and analyzed by the client computer for identity establishment.

In another aspect, the invention relates to a system for provisioning a client computer. The system preferably includes an authentication module and a server. The authentication module establishes an identity of a client user based on strong authentication data. The server remotely provides to the client computer, based on the established user identity, a set of provisioning modules specific to the user for execution on the client computer. Execution of the provisioning modules causes transfer information onto the client computer. In all embodiments, the strong authentication data may be biometric indicia.

In one embodiment, the execution of the provisioning modules causes installation of application programs and/or user-specific data onto the client computer. The client computer can, for example, include a biometric input device for obtaining the indicia. Moreover, the client computer can include a communication module for transmitting the indicia to the server for identity establishment, or may instead include an analysis module for analyzing the indicia for identity establishment.

In another aspect, the invention relates to an article of manufacture having computer-readable program portions embodied therein for generating a trusted communication channel with a client. The article comprises computer-readable program portions for performing the method steps described above.

BRIEF DESCRIPTION OF THE DRAWINGS

The above and further advantages of the invention may be better understood by referring to the following description taken in conjunction with the accompanying drawing, in which.

DETAILED DESCRIPTION

Figure 1:
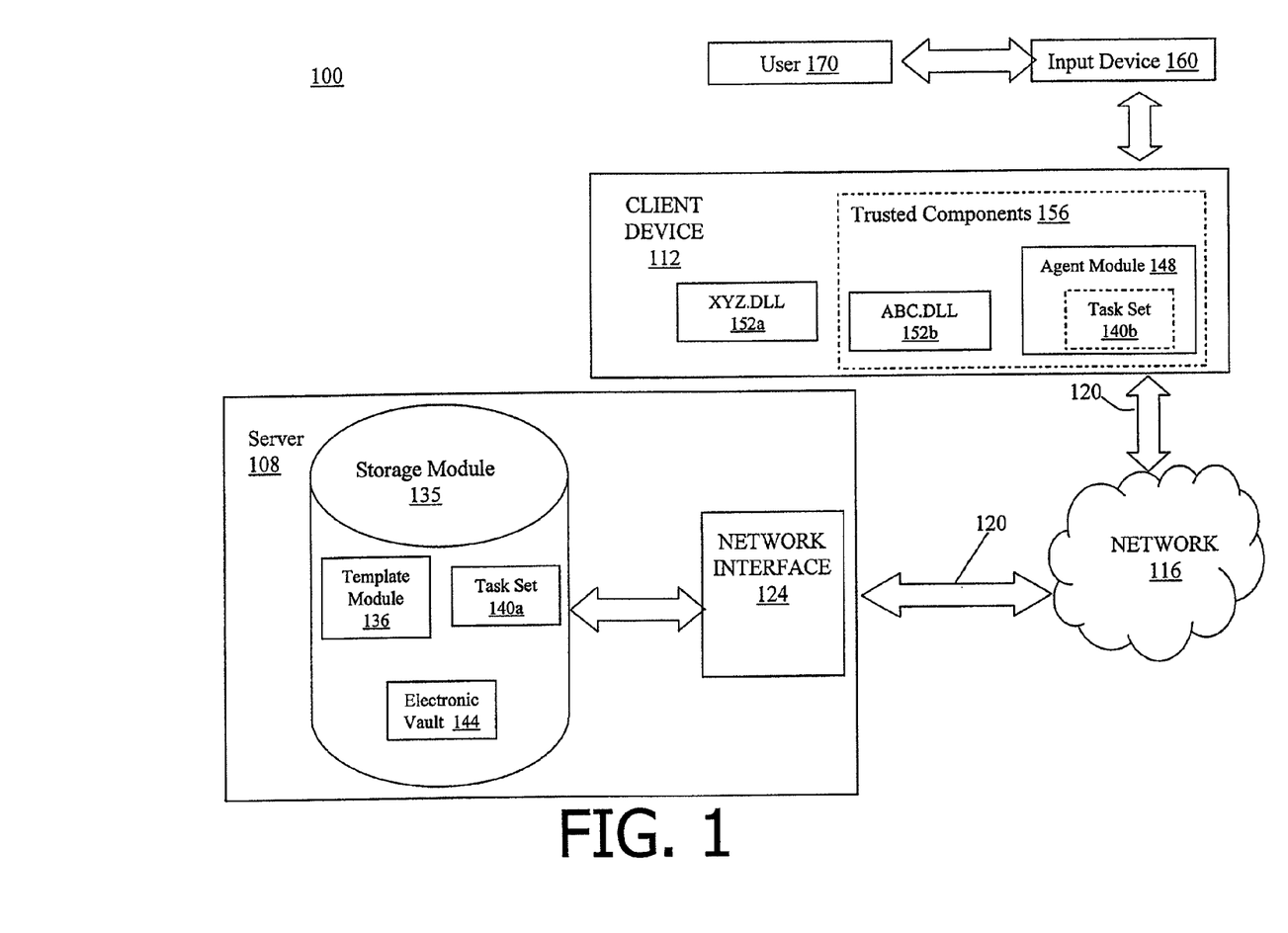
FIG. 1 is a block diagram of an illustrative embodiment of a system to authenticate a user using biometrics in accordance with the invention.

In broad overview, FIG. 1 illustrates an embodiment of a system 100 to authenticate a user using an unknown client device in accordance with the invention. The system 100 includes a first computing system ("a server node") 108 and a second computing system ("a client node") 112, all in communication with a network 116. The server node 108 and the client node 112 are in communication with the network using communication channels 120.

For example, the network 116 and the communication channels 120 can be part of a local-area network (LAN), such as a company Intranet, a wide area network (WAN) such as the Internet or the World Wide Web or the like. The nodes 108 and 112 communicate with the network 116 through the communication channels 120 using any of a variety of connections including, for example, standard telephone lines, LAN or WAN links (e.g., T1, T3, 56kb, X.25), broadband connections (ISDN, Frame Relay, ATM), wireless connections and the like. The connections can be established using a variety of communication protocols (e.g., HTTP(S), TCP/IP, SSL, IPX, SPX, NetBIOS, Ethernet, RS232, direct asynchronous connections, a proprietary protocol and the like). In one embodiment, the server 108 and the client 112 encrypt all communication when communicating with each other.

The server node 108 can be any computing device capable of providing the services requested by the client node 112. Particularly, this includes authenticating a user at the client node 112 using strong authentication data, as described in more detail below. The server node 108 includes a network interface module 124 and a storage module 135, which may be, for example, persistent memory, one or more hard disks, optical drives and the like. The storage module 135 can include a template module 136, in which a reference set of strong authentication data (e.g., biometric data) is stored. The storage module 135 can include an instance 140a of a task set 140. A task set 140 includes a set of specific actions/tasks that the client 112 needs to perform for an associated authenticated user. For example, the task set 140 can be a set of instructions. The task set 140 can be a set of provisioning modules specific to the user for execution on the client 112, where the execution of the provisioning modules causes transfer of information onto the client 112. The functionality to actually perform these tasks, as will be seen, may reside within the client 112 or may instead originate outside the client 112.

The storage module 135 can include an electronic vault module 144, in which user credentials (e.g., login accounts, URL/password combinations, digital certificates and the like) for an associated authenticated user are stored. The modules throughout the specification are implemented as one or more software programs and/or hardware devices (e.g., ASIC, FPGA, processor, memory, storage and the like). For clarity, FIG. 1 depicts server node 108 as a single server. It is to be understood, however, that the server node 108 can also be implemented, for example, distributed on portions of several (i.e., more than two) servers.

The client node 112 can be any computing device (e.g., a personal computer, set top box, wireless mobile phone, handheld device, personal digital assistant, kiosk, etc) used to provide a user interface to access the server 108. The client 112 includes an agent module 148. The client agent module 148 can be implemented, for example, as a NETSCAPE plug-in or an ACTIVEX control. The agent module 148 is configured to interface with a strong authentication input device 160 (e.g., a fingerprint scanner, a retina scanner, a thermal imager, a skin spectrometer, a voice print analyzer, USB or smart card reader, one-time password generators that compute a unique password, a digital camera and the like) and the server 108. The client agent 148 allows an embedded (e.g., html) object within a network browser on the client 112 to control the input device 160 and receive a candidate set of biometric data associated with the user 170. In one embodiment, because the agent module 148 interfaces with the input device 160, the agent module 148 runs as native code on the client 112. For example, ACTIVEX controls components or CAB files that are signed can be downloaded and installed within the Windows operating system without any user involvement. The downloaded agent module 148 can optionally include an instance 140b of a task set 140. Preferably, the optional instance 140b includes those actions/tasks that the agent module 148 performs each time the network browser initializes the agent module 148. For example, the client agent 148 can be configured to retrieve a candidate set of biometric data from the user 170 and to transmit the retrieved candidate set of biometric data to the server 108 for authentication each time it is initialized. As such, the optional task set 140b includes these tasks of retrieving and transmitting within its set of tasks. Alternatively, the task set 140b may originate with the client 112 or may be provided by the user 170.

The client 112 also includes client components 152a and 152b, generally 152. The client components 152, as illustrated, represent dynamic link libraries ("DLLs"). Other client components 152 can be, for example, memory buffers, the agent module 148, device drivers, data files, digital certificates, registry keys, resource files, other client 112 hardware resources, other client 112 software resources, and the like. As described in more detail below, the agent module 148 determines which components 152 are trustworthy components 156. In the illustrated embodiment of FIG. 1, the agent module 148 has determined that itself 148 and client component 152b are trustworthy components 156.

To use the system 100, a user 170, also referred to as a subscriber, registers that user's biometric data with the system 100. The biometric data can include, for example, data associated with the individual's fingerprint(s), facial characteristics, voice and the like. The system 100 stores a set of biometric data associated with the user 170 in the storage module 135, for example in the template 136, in the electronic vault 144. In one embodiment, the biometric data is stored using an alias (e.g., a unique identifier with no personal or other type of information that can identify an individual), so that if the security of the storage module 135 is compromised, the biometric data cannot be associated with a particular individual. Other strong authentication data can also be registered. For example, the user can insert a smart card into a reader, or enter a local pin and/or use the secret key (of a public/private key combination) to sign a challenge generated by the server 108 and return it. In the latter case, the server 108 validates the signature of the response against the public key associated with the user (stored as a credential for the associated subscriber) in order to validate his/her identity.

Figure 2:
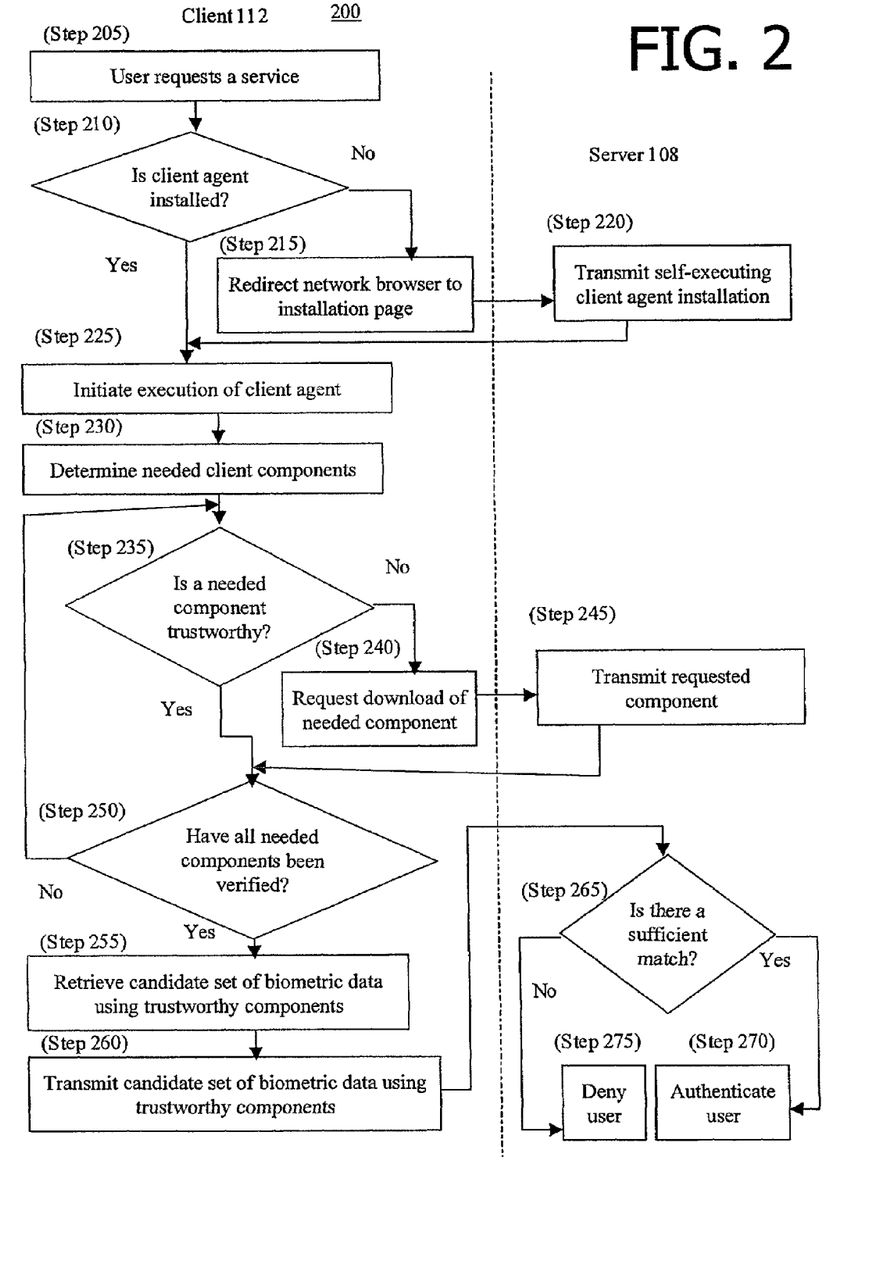
FIG. 2 is a flow diagram of an illustrative embodiment of a process to authenticate a user using biometrics in accordance with the invention.

With an individual registered (e.g., with biometric information obtained and stored), a process 200 as shown in FIG. 2 may be used to authenticate a user using biometric data and a system as depicted, for example, in FIG. 1. In general overview, the user 170 requests (step 205) a service over the network 116 that requires authentication. When the user 170 requests (step 205) services requiring authentication, the client 112 determines (step 210) whether the agent module 148 has been installed on the client 112. If the client 112 determines (step 210) the agent module 148 is not installed, the client's network browser, for example, can be redirected (step 215) to an installation page on the server 108, or another server on the network 116, for download and installation instructions. The server 108, or another server on the network 116, distributes (step 220) the agent module 148, for example, as a signed plug-in that can be downloaded as an self-executing program that copies, for example in a WINDOWS operating system environment, the proper DLLs and SDKs to the "Windows\System" or "Winnt\System32" directories for interfacing with the input device 160. During installation, the client 112 copies the agent module 148, for example, to either the NETSCAPE or Internet Explorer directory, depending on the network browser(s) that are on the client 112. If Internet Explorer is the network browser chosen, the appropriate registry keys are set. In one embodiment, the client agent 148 can be implemented in C++ according to the NETSCAPE plug-in specification to run within Win95, Win98, Win98/SE, Win2000, and/or Win/NT environments.

Once installed, or if the client determines (step 210) that the agent module 148 is already installed, the network browser launches (step 225) the agent module 148 when the client 112 receives a request for authentication and/or establishing a trusted communications channel. For example, the network browser can receive an html page containing an <embed> statement that references a source file with a specified extension. This can be, for example, a ".fpt" extension. When the network browser makes a request for the .fpt file, the server 108 responds with a special mime type "application-x/FPT-Template," for example, an instance of a task set 140, to trigger the network browser to load and initialize the agent module 148. To establish an authenticated and trusted communications channel, the task set 140 includes a set of the actions/tasks for the client 112 to retrieve a candidate set of biometric data from the user 170 and transmit the retrieved candidate set of biometric data to the server 108 for authentication. As described above, because these tasks (i.e., retrieving and transmitting a candidate set of biometric data) can be the first tasks the agent module 148 performs, instead of the being included in a task set 140a transmitted by the server 108, these tasks can be included in the optional task set 140b, which is part of the downloaded agent module 148.

The agent module 148 determines (step 230) which client components 152 are needed by it 148 to perform the tasks included in the task set 140. The agent module 148 determines (step 235) whether it and any needed components 152 are trustworthy components 156. For example, the agent module 148 can examine the digital signatures and/or digests of itself and the needed client components 152 to verify that nothing has been altered. The agent module 148 can also verify the digests for all versions of client components 152 needed by the agent module 148 against the server 108 for the same version of the platform. If the agent module 148 determines (step 235) that a component (e.g., in the illustrated embodiment, component 152a) is not trustworthy, the agent module 148 does not use that component. The client agent 148 can, for example, request (step 240) a trustworthy version from the server 108. Upon such a request, the server 108 transmits (step 245) the requested component 152 to the client 112 for use by the client agent 148. The client agent determines (step 235) if the component received from the server 108 is trustworthy, to ensure that no changes were made during transmission. The client agent 148 determines (step 250) whether it and all of the needed components 152 have been examined. If not, the agent module 148 repeats step 235 for any additional needed components 152.

In addition to assuring the needed components 152 have not been altered, the agent module 148 can also take other precautions to ensure that the communications channel it establishes with the server 108 is secure. For example, the agent module 148 can statically load the needed components 152 to protect against Trojan horse attacks; can internally manage memory allocations to block memory snooping; can scramble used memory when releasing the used memory locations back to the client 112 to block memory snooping; and/or can impose strict buffer size checking to prevent buffer writing attacks.

When the client agent 148 determines (step 250) that all of the needed components 152 have been verified, the agent module 148 retrieves (step 255) a candidate set of biometric data from the user 170 using the trustworthy components 156. To begin retrieving (step 255), the agent module 148, for example, can check for known devices 160 in communication with the client 112, for example on the PCMCIA, USB and/or parallel port. For even greater security the agent module 148 can verify the identity and serial number of the input device 160 to ensure the device 160 is valid. Once the input device 160 is validated, the agent module can employ a graphical user interface ("GUI") to assist the user 170 during the retrieval (step 255) of the candidate set of biometric data. For example, the agent module 148 can display a graphic image of an icon and/or trademark representing the manufacturer of the agent module 148 and/or the administrator of the system 100. The GUI guides the user 170 through the retrieval process (step 255). For example to provide the user 170 with a visual feedback on proper position of the finger on the sensor, an approximate core location of the scanned print is computed and used to generate positioning hints such as "move up" or "move down." The agent module 148 initiates the scan for fingerprint images from the input device 160 using the trustworthy components 156.

The agent module 148 transmits (step 260) the candidate set of biometric data to the server 108 for authentication using the trustworthy components 156. The server 108 (e.g., an authentication module) determines (step 265) whether the candidate set of biometric data sufficiently matches a reference set of biometric data stored on the server 108. The reference set of biometric data can be stored, for example, in the template 136. Alternatively, as illustrated in connection with FIG. 3, the reference set of biometric data can be stored as part of the electronic vault 144. If the server 108 determines (step 265) that the candidate set of biometric data sufficiently matches the reference set of biometric data, the server 108 authenticates (step 270) the user 170 as the registered individual. If the server 108 determines (step 265) the candidate set of biometric data does not sufficiently match the reference set of biometric data, the server 108 rejects (step 275) the user 170.

The server 108 may determine the sufficiency of the match by statistically analyzing the two sets of biometric data and determining whether the probability that they come from the same individual is above a certain predetermined threshold. In one embodiment, an administrator of the system 100 sets the predetermined threshold. The predetermined threshold determines both the false acceptance rate (i.e., the probability that the server 108 will incorrectly authenticate a user) and the false rejection rate (i.e., the probability that the server 108 will incorrectly reject authentication of the user when that user is in fact the registered individual). The administrator sets the predetermined threshold such that the false acceptance rate and the false rejection rate are both acceptable to the users of the system 100.

The statistical analysis can be any of the well-known analysis techniques employed by those skilled in the art (e.g., statistical pattern matching or image-registration techniques, pattern-recognition techniques involving feature extraction and classification in either the spatial domain or the frequency domain, or heuristic methods involving, e.g., neural networks). For example, for fingerprint comparison, the number of landmarks (e.g., ridges) and their location (e.g., x, y coordinates) and the variance between the sets of data are statistically analyzed for to calculate a probability that the candidate set of biometric data matches the reference set of biometric data.

In one embodiment, using a smart card, the reference finger print biometrics data may be stored directly on the smart card and be locally verified by the agent module 148. In another embodiment, a smart card can be used to validate the user. During this process, the subscriber logs into the server 108 requesting authentication. The server 108 validates the logon and generates a random string to serve as a challenge to the client 112. The client 112 receives the challenge and asks the subscriber to insert the appropriate smart card associated with the subscriber. If the content of the smart card is secured using a password, the subscriber must enter that password to allow access. If the contents are secured with a system generated pin, the agent module 148 can use its downloaded pin (retrieved from the storage module 135) to open the content of the smart card. Once the smart card is opened for read access, the agent module 148 reads out the private key associated with the smart card and uses the private key to sign the challenge string to produce the response. The response code is then returned to the server 108 for validation. The network interface 124 receives the resulting response and using the public key associated with the subscriber (stored in module 135), the network interface 124 applies the public key to the signature to validate the response which could only be generated using the private key in the smart card.

To improve the retrieval process (step 255) and the authentication process (step 265), the server 108 and/or the client agent 148 can employ additional techniques. For example, the server 108 and/or the client agent 148 may normalize biometric data into a format used by the server 108. The normalization can include, for example, a translation algorithm, a transformation algorithm and the like. Normalization allows biometric data to be converted into a standard image suitable for subsequent processing and preferably includes geometric processing to adjust for size differences between sensors, orientation adjustments to invert or rotate images, density adjustments to correct for number of gray levels/dynamic range and sampling adjustments to account for different sensor resolutions. This allows the client agent 148 to interface with different types of input devices 160 without the need to re-register the user or change the format of the biometric data in the storage module 135.

The server 108 and/or the client agent 148 may also filter the received candidate set of biometric data. The filtering can include filtering algorithms for correcting blurring of the image, for removing random noise in the image and the like. For example, all captured scans can be checked for partial or blurred prints that exhibit greater than expected amount of change between consecutive frames as well as contrast. Images that exhibit excessive blur can be rejected. Contrast issues can be resolved by asking the user to press down to make better contact with the sensor. Image processing software may be used to enhance the quality of the image and involve signal averaging, noise filtering, ridge/valley enhancement as well as gray scale equalization. The filtering can also include filtering algorithms dictated by the type of the input device 160 or the type of user features the input device 160 uses. The filtering can also include filtering algorithms based on the type of image (e.g., grainy, wet, fine grain and the like), the finger type and/or personal biometric characteristics (e.g., sex, age and the like). In an embodiment where the filter module 144 is implemented on the client 112, the filter module 114 operates in conjunction with the input device 160 to perform, e.g., blur removal, finger detection and time based enhancements. For example, two or more scans are may be taken to ensure the user 170 has placed a stable finger (not moving) on the sensor. A difference is then taken between subsequent scans to ensure consistency between the two scans. With noisy sensors, the filter module 144 may integrate consecutive images to reduce the noise level in the captured image.

The server 108 and/or the client agent 148 may also extract the associated geometric data of features and/or minutiae from the candidate set of biometric data. In an embodiment where the extractor module 146 is implemented on the client 112, the extractor module 146 transmits the results to the authentication module 128 using the network 116. Biometric data, for example in the case of fingerprints, can be divided into global features that are spatial in nature and local features that represent details captured in specific locations. The geometric data can include, for example, the locations (e.g., x, y coordinates) of the features, the type of feature (e.g., ridge ending, bifurcation and the like), the angular data of the features, the slope of the ridge, the neighborhood ridge counts and/or the like. In one embodiment, the server 108 can transfer all or a portion of the reference set of biometric data so that the client 112 (e.g., an authentication module, which can be part of the client agent 148) can determine whether there is a sufficient match between the candidate set and reference set to establish an authenticated identity.

In other embodiments, other techniques are employed to further secure the data the client agent 148 transmits (step 260) to the server 108. For example, once the client agent 148 retrieves (step 255) a minimum quality candidate set of biometric data, the client agent 148 can encrypt that biometric data using a symmetric encryption key prior to transmitting (step 260). The client agent 148 can compress the candidate set of biometric data (e.g., the landmark or minutiae data) to reduce the amount of information that it transmits (step 260) to the server 108. The client agent 148 can encrypt the data using a public key provided by the server 108 during the client agent 148 initialization. In the embodiment storing the reference set of biometric data under an alias, the encrypted candidate set of biometrics data and the associated session key are preferably the only data exchanged with the server 108—that is, no user identification information is exchanged to protect the privacy of the biometrics data.

With authentication of the user, the client agent 148 has established a trusted communications channel with the server 108. The channel is trusted because the client agent 148 has verified that at least a portion of the components 152 of the client 112 are trustworthy and can be used without fear of compromised security. Further, once the server 108 authenticates the user 170 using biometrics, there is an assurance, to a certain statistical probability, that the user 170 is the registered individual. In addition to using the trusted communications channel to authenticate the user 170, the channel can be used to perform other actions/tasks requiring a trusted channel. For example, an administrator can use the channel to transmit an instance 140*a* of a task set 140 associated with the authenticated user 170 to configure the client 112 in a customized fashion for that user 170 and/or control what the server 108 downloads to the client 112. Thus, the task set 140 may include requesting, from the server 108, a series of self-extracting, self-installing files to place specific application programs on the client 112, i.e., application programs such as word processors, spreadsheets, database programs, and the like to which the particular user 170 is entitled. The task set 140 may also request particular data files (e.g., associated with the downloaded applications) specific to the user 170, which may be downloaded and stored on the client 112, or to which the client may be accorded remote access. In this way, the user's entire client configuration can be customized and/or rebuilt, or provided with upgrades and/or updated versions of application programs. In another example, the task set 140 can include scripts or other executable software with parameters that are either retrieved from the storage module 135 for each subscriber or generated dynamically. These scripts, for example, can be used to automate the logon process for a subscriber with username password information retrieved from the storage module 135. Other uses might include the download and installation of sensitive information such as digital certificates, decryption keys or digital signature keys used to authenticate content. In addition, the agent 148 can be used to download subscription-based content that can only be accessed by a specific authenticated individual The server 108 retrieves the instance 140*a* of a task set 140 associated with the authenticated user 170 and transmits the instance 140*a* to the client agent 148. The client agent 148 determines whether any additional client components 152 are needed to complete the tasks of the transmitted task set 140*a*. If the client agent 148 needs additional components 152 and these additional needed components 152 were not previously determined to be trustworthy components 156, the client agent 148 determines if these additional needed components 152 are trustworthy, using the techniques as described above.

Figure 3:
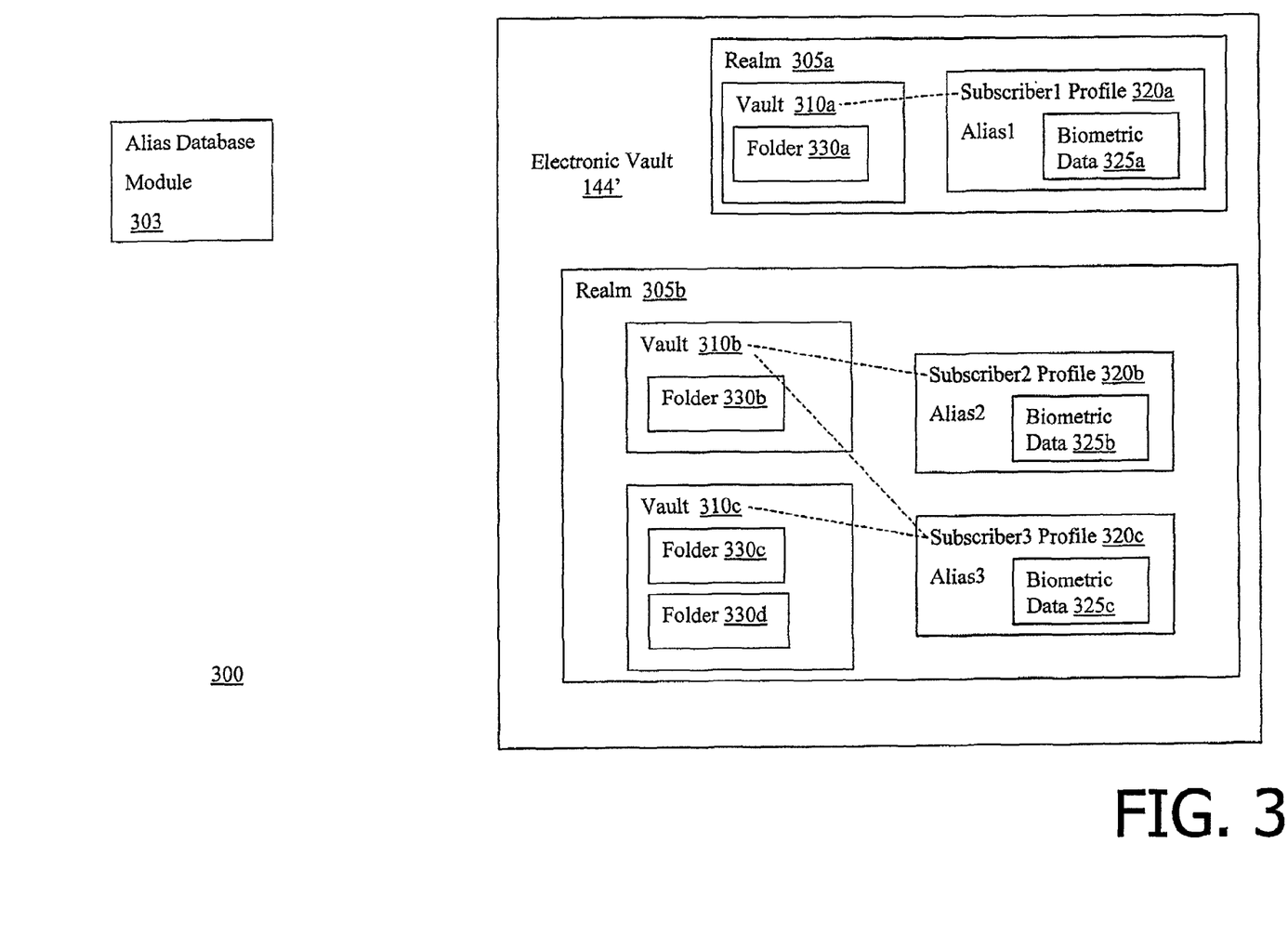
FIG. 3 is a block diagram of a data structure used to authenticate a user using biometrics in accordance with the invention.

In another example, the client agent 148 uses the trusted channel to obtain credentials associated with the authenticated user 170 to transmit to other servers on the network 116 providing requested services. The user credentials can be stored in the electronic vault 144. FIG. 3 illustrates an embodiment of a data structure 300 that can be used with the electronic vault 144' to securely store user credentials. The data structure 300 is hierarchically organized into realms, vaults, and folders, as further explained below, and is useful in connection with the system 100 as well as in other authentication systems.

The illustrated data structure 300 stores biometric data using an alias. Preferably, an alias database module 303, associating the stored aliases with users, is logically or physically separate from the electronic vault 144'. The use of an alias is not required, but adds another layer of security by keeping identifying information separate from an individual's biometric data. The electronic vault 144' includes a first realm 305*a* and a second realm 305*b*, generally referred to as 305. In general, a realm 305 is a security partition, grouping subscribers according to a scheme relevant to an application server. For example, a financial-services company might group subscribers by state or by service tier. In one embodiment, each security realm 305 corresponds to a separate set of objects assigned its own symmetric encryption key to ensure that data from one realm (e.g., 305*a*) is not usable by another realm (e.g., 305*b*).

The first realm 305*a* includes a first vault 310*a* and a first subscriber profile 320*a*. The first subscriber profile 320*a* includes an alias associated with the subscriber and a reference set of biometric data 325*a* associated with the alias. The first vault 310*a* includes a first folder 330*a*. As illustrated, subscriber1 is associated with the first vault 310*a*. In this context, the term "subscriber" refers to an individual identified by his/her alias, which is associated with biometric data 325. The biometric data 325 represents a set of biometric characteristics that uniquely identifies the subscriber, including but not limited to finger templates, facial templates, retinal templates, and/or voice prints. Each vault 310 contains one or more folders 330, and is accessible to one or more subscribers, so that each subscriber owns one or more vaults 310 within a realm. The folders 330 within each vault 310, in turn, contain assets and/or user credentials. A folder 330 can be modified only by the owner of the vault 310, and is associated with a list of subscribers 320, or "folder users," eligible for access.

The second realm 305*b* includes a second vault 310*b* and a third vault 310*c*, generally referred to as 310. The second realm 305*b* also includes a second subscriber profile 320*b* and a third subscriber profile 320*c*, generally referred to as 320. The second subscriber profile 320*b* includes an alias associated with subscriber2 and a reference set of biometric data 325*b* associated with the alias. The third subscriber profile 320*c* includes an alias associated with subscriber3 and a reference set of biometric data 325*c* associated with the alias. The second vault 310*b* includes a second folder 330*b*. The third vault 310*c* includes a third folder 330*c* and a fourth folder 330*d*, generally referred to as 330. As illustrated, subscriber2 is associated with the second vault 310*b*. Subscriber3 is associated with the second vault 310*b* and the third vault 310*c*. Accordingly, there need not exist a one-to-one mapping between subscribers and vaults; more than one subscriber may have access to a single vault, for example, and a single subscriber may have access to multiple vaults within a realm.

In one embodiment, accessing the electronic vault 144' triggers the process described in connection with FIG. 2. For example, the subscriber (e.g., subscriber2) may request access to the subscriber's associated folder (e.g., 330*b*), or an application server can request a specific set of subscriber's credentials to service the subscriber requests. The alias database module 303 finds the associated alias (e.g., alias2) of the subscriber and passes a request for the credentials to the electronic vault 144'. The server 108 passes a request for authentication to the client 112. In response to this request, the client 112 downloads, if needed, and initiates the execution of the client agent 148, following the process as described in connection with FIG. 2. Continuing with the process in FIG. 2, the client agent 148 eventually retrieves (step 255) and transmits (step 260) the candidate set of biometric data. After receiving the candidate biometric data, the server 108 verifies there is a sufficient match with the reference set of biometric data associated with the alias (e.g., 325*b*). With authentication, the subscriber and/or client agent 148 is allowed access to the folder (e.g., 330*b*). The requested credentials within the folder (e.g., 330*b*) are transmitted to the client device 112 on the network 116 requesting the service. The requested credentials can be processed by the agent module 148 to automate the logon process on behalf of the subscriber. The task set 140 can also be used in conjunction with credentials to automate secure logons on behalf of the subscriber.

Equivalents

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of provisioning a client computer using a secure channel and trustworthy resources, the method comprising the steps of:
    identifying all client-based components required for the client computer to obtain from the user and to transmit biometric data,
    verifying that the identified components are trustworthy components that have not been altered;
    establishing a secure communication channel with at least one server;
    using only components verified as trustworthy, obtaining a candidate set of biometric data from the user;
    using only components verified as trustworthy, transmitting the biometric data over the secure communication channel to the server for authentication and to establish the user's identity; and
    based on the established user identity, receiving, over the secure communication channel and using only components verified as trustworthy, a set of provisioning modules specific to the user for execution on the client computer in order to cause transfer of information onto the client computer.

2. The method of claim 1 wherein the strong authentication data consists of biometric indicia.

3. The method of claim 1 wherein, if any of the identified components are not verified to be trustworthy, requesting and receiving from at least one said server trustworthy versions thereof using the secure communication channel.

4. The method of claim 1 wherein the components are verified as trustworthy via communication with at least one said server using the secure communication channel.

5. The method of claim 1 wherein the identifying step is performed by an agent executing on the client computer and further comprising the step of causing the agent to verify that it is itself a trustworthy component.

6. The method of claim 5 wherein the agent verifies that it and the identified components are trustworth by examining at least one of digital signatures or digests thereof to verify that nothing has been altered.

7. A system for provisioning a client computer using a secure channel and trustworthy resources, the system comprising:
    an authentication device for establishing an identity of a client user based on strong authentication data, the authentication device comprising (i) one or more client-based components enabling the client to obtain from the user and to transmit biometric data and (ii) an agent for:
        (a) identifying all client-based components required for the client computer to obtain from the user and to transmit the biometric data;
        (b) verifying that the identified components are trustworthy components that have not been altered;
        (c) establishing a secure communication channel with at least one server; and
        (d) using only components verified as trustworthy, obtaining a candidate set of biometric data from the user and, using only components verified as trustworthy, transmitting the biometric data over the secure communication channel to the server for authentication to establish the user's identity; and
    a server device for remotely providing to the client computer, based on the established user identity, a set of provisioning modules specific to the user for execution on the client computer, the execution of the provisioning modules causing transfer information onto the client computer, wherein the provisioning modules are received over the secure communication channel using only components verified as trustworthy.

8. The system of claim 7 wherein the strong authentication data are biometric indicia.

9. The system of claim 8 wherein the client computer comprises a biometric input device for obtaining the indicia.

10. The system of claim 9 wherein the client computer comprises a communication module for transmitting the indicia to the server for identity establishment.

11. The system of claim 9 wherein the client computer comprises an analysis module for analyzing the indicia for identity establishment.

* * * * *